US011099855B2

(12) United States Patent
Yu

(10) Patent No.: US 11,099,855 B2
(45) Date of Patent: Aug. 24, 2021

(54) SYSTEM AND METHOD FOR UPDATING FILES THROUGH A PEER-TO-PEER NETWORK

(71) Applicant: American Megatrends International, LLC, Norcross, GA (US)

(72) Inventor: Sean Yu, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/661,558

(22) Filed: Oct. 23, 2019

(65) Prior Publication Data

US 2021/0124592 A1    Apr. 29, 2021

(51) Int. Cl.
*G06F 9/4401* (2018.01)
*G06F 9/455* (2018.01)
*G06F 16/182* (2019.01)
*G06F 8/658* (2018.01)
*G06F 40/194* (2020.01)

(52) U.S. Cl.
CPC ............ *G06F 9/4406* (2013.01); *G06F 8/658* (2018.02); *G06F 9/45541* (2013.01); *G06F 16/1834* (2019.01); *G06F 40/194* (2020.01)

(58) Field of Classification Search
CPC .... G06F 8/658; G06F 9/4406; G06F 9/45541; G06F 16/1834; G06F 40/194
See application file for complete search history.

(56) References Cited

U.S. PATENT DOCUMENTS

| | | | | |
|---|---|---|---|---|
| 6,041,124 A | * | 3/2000 | Sugita | H04B 1/707 380/270 |
| 7,203,753 B2 | * | 4/2007 | Yeager | G06F 9/544 709/223 |
| 7,783,777 B1 | * | 8/2010 | Pabla | G06F 16/1834 709/238 |

(Continued)

FOREIGN PATENT DOCUMENTS

CN    103092735 A    *    5/2013

OTHER PUBLICATIONS

Zhou et al., "A Bare-Metal and Asymmetric Partitioning Approach to Client Virtualization", Mar. 2014, IEEE, vol. 7, No. 1 (Year: 2014).*

(Continued)

*Primary Examiner* — Wei Y Zhen
*Assistant Examiner* — Junchun Wu
(74) *Attorney, Agent, or Firm* — Birch, Stewart, Kolasch & Birch LLP

(57) ABSTRACT

A system and a method for updating files through a peer-to-peer (P2P) network are provided. The system includes a plurality of device nodes, and a link manager. The device nodes are distributed in a peer-to-peer network and respectively have baseboard management controllers (BMCs). The link manager connects to the peer-to-peer network via a management network and includes an update engine. The device nodes include at least a first device node, a second device node and a third device node. The link manager sends an update command to the peer-to-peer network. The update engine arranges a first update from the first device node to the second device node, and arranges a second update from the second device node to the third device node.

38 Claims, 13 Drawing Sheets

(56) References Cited

U.S. PATENT DOCUMENTS

| | | | | |
|---|---|---|---|---|
| 7,987,449 | B1* | 7/2011 | Marolia | H04L 67/1095 717/120 |
| 8,024,723 | B2* | 9/2011 | Nahm | H04L 67/104 717/172 |
| 8,166,074 | B2* | 4/2012 | Pettovello | G06F 16/1837 707/797 |
| 2006/0130037 | A1* | 6/2006 | Mackay | G06F 8/658 717/168 |
| 2007/0143459 | A1* | 6/2007 | Batteram | G06F 21/6245 709/223 |
| 2009/0089567 | A1* | 4/2009 | Boland, IV | G06F 8/65 713/2 |
| 2010/0199272 | A1* | 8/2010 | Mahajan | G06F 11/2023 717/171 |
| 2010/0332633 | A1* | 12/2010 | Keys | H04L 67/125 709/223 |
| 2010/0333080 | A1* | 12/2010 | Keys | G06F 8/658 717/171 |
| 2010/0333082 | A1* | 12/2010 | Keys | G06F 8/658 717/173 |
| 2011/0106886 | A1* | 5/2011 | Nolterieke | G06F 8/65 709/204 |
| 2011/0225405 | A1* | 9/2011 | Lyons | G06F 9/4406 713/2 |
| 2012/0036504 | A1* | 2/2012 | Masters | G06F 8/71 717/171 |
| 2013/0124841 | A1* | 5/2013 | Huang | G06F 9/4406 713/2 |
| 2013/0318371 | A1* | 11/2013 | Hormuth | G06F 1/28 713/320 |
| 2014/0237465 | A1* | 8/2014 | Lin | G06F 8/656 717/173 |
| 2014/0344431 | A1* | 11/2014 | Hsu | H04L 41/0213 709/223 |
| 2016/0147526 | A1* | 5/2016 | Camp | H04W 4/50 717/171 |
| 2017/0289245 | A1* | 10/2017 | Losacco | G06F 16/1834 |
| 2018/0024609 | A1* | 1/2018 | Bolt | G06F 1/305 713/323 |
| 2018/0316729 | A1* | 11/2018 | Chauvet | G06F 9/50 |

OTHER PUBLICATIONS

Castro-Leon et al., "Bare Metal Clouds", 2016, Enrique Castro-Leon and Robert Harmon (Year: 2016).*

Suzaki et al., "Bare-Metal Container", 2016, IEEE (Year: 2016).*

Roussopoulos et al., "CUP: Controlled Update Propagation in Peer-to-Peer Networks", 2003, Stanford University (Year: 2003).*

* cited by examiner

| Device Node | Version |
|---|---|
| 210A | V1,V4 |
| 210B | N/A |
| 210C | V2,V4 |
| 210D | N/A |
| 210E | V2 |
| 210F | N/A |

| Device Node | Version | |
|---|---|---|
| 210A' | V1,V4 | 410' |
| 210B' | N/A | |
| 210C' | V2,V4 | |
| 210D' | N/A | |
| 210E' | V2 | |
| 210F' | N/A | |

FIG. 11

SYSTEM AND METHOD FOR UPDATING FILES THROUGH A PEER-TO-PEER NETWORK

BACKGROUND OF THE INVENTION

1. Field of the Invention

The invention generally relates to a file update technique. Particularly, the invention relates to a system and a method for updating file through a peer-to-peer network.

2. Description of the Prior Art

An industry standard called Intelligent Platform Management Interface (IPMI), defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard management controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

Generally, the BIOS/BMC firmware update is executed through a pre-boot execution environment (PXE). The PXE model provides computers the ability to load and execute a network bootstrap program (NBP) from a server on the network prior to, or in the alternative, booting the operating system on a local hard drive. However, the update task through PXE has to execute sequentially owing to the single source, and it can become time-consuming when it refers to a mass deployment.

A peer-to-peer (P2P) system has brought a new way to harness scattered or distributed resources in networks. In the peer-to-peer system, distributed nodes, or peers, preserve information about other peers for future remote resource sharing, as shown in FIG. 1. In FIG. 1, nodes 21A to 21F are scattered in the peer-to-peer system 20. These nodes connect to each other to share resources, and each node serves as a client or a server according to the scenario.

SUMMARY OF THE INVENTION

It is an object of the invention to provide a rapid, mass, and de-centralized deployment system for updating files through a peer-to-peer network.

It is another object of the invention to provide a deployment system for updating files via an out-of-band network.

It is another object of the invention to provide a system, which can support parallel file update to a large number of distributed nodes.

It is another object of the invention to provide a system, which provides hand-off mechanism without additional configuration when a main source fails.

In an embodiment, the invention provides a system for updating files through a peer-to-peer network. The system includes a plurality of device nodes, and a link manager. The device nodes are distributed in a peer-to-peer network and respectively have BMCs. The link manager connects to the peer-to-peer network via a management network and includes an update engine. The device nodes include at least a first device node, a second device node and a third device node. The link manager sends an update command to the peer-to-peer network. The update engine arranges a first update from the first device node to the second device node, and arranges a second update from the second device node to the third device node.

In another embodiment, the invention also provides a method for updating files through a peer-to-peer network. The method includes the steps of: sending an update command to the peer-to-peer network by a link manager; arranging a first update from a first device node to a second device node by an update engine; and arranging a second update from the second device node to a third device node by the update engine. The first device node, the second device node and the third device node are selected from a plurality of device nodes distributed in a peer-to-peer network; the device nodes respectively have BMCs; and the link manager is connected to the peer-to-peer network via a management network and include the link manager.

In another embodiment, the invention also provides a system for updating file through a peer-to-peer network. The system includes a plurality of device nodes, a link manager, and a source node. The device nodes distributed in a peer-to-peer network and respectively have BMCs. The link manager connects to the peer-to-peer network via a management network and includes an update engine. The source node connects to the peer-to-peer network via the management network and has at least one version of source files. At least one of the device nodes requests for an update version of source files. The update engine assigns a service node to the requesting device node and redirects the request to the service node.

In another embodiment, the invention also provides a method for updating files through a peer-to-peer network. The method includes the steps of: requesting for an update version of source files by at least one of device nodes; and assigning a service node to the requesting device node and redirecting the request to the service node by a link manager. The device nodes are distributed in a peer-to-peer network and respectively have BMCs; a link manager connects to the peer-to-peer network via a management network and includes an update engine; a source node connects to the peer-to-peer network via the management network and has at least one version of source files.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is an embodiment of the index;
FIG. 11 is an embodiment of the index.

DETAILED DESCRIPTION OF THE PREFERRED EMBODIMENT

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
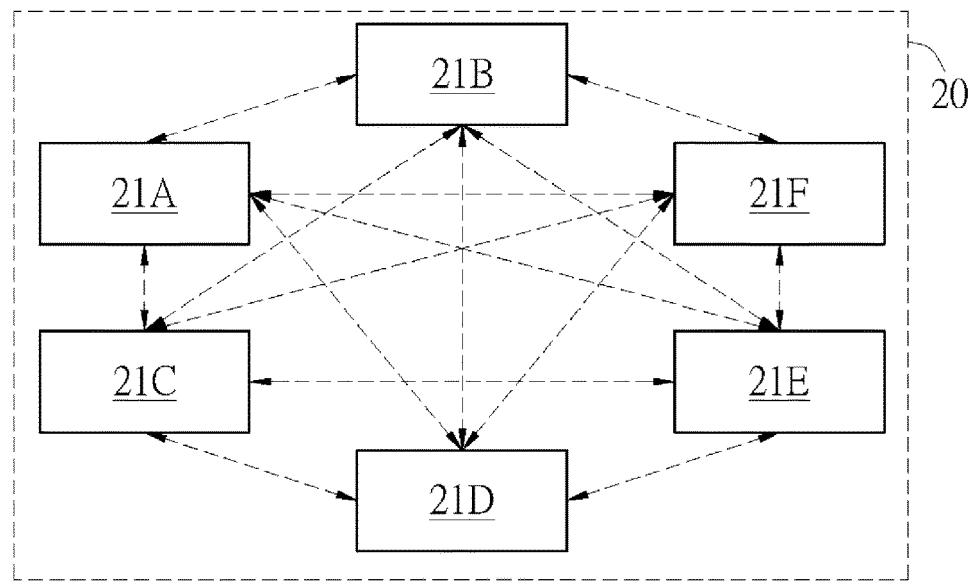
FIG. 1 is a prior art of a peer-to-peer system.
Figure 2:
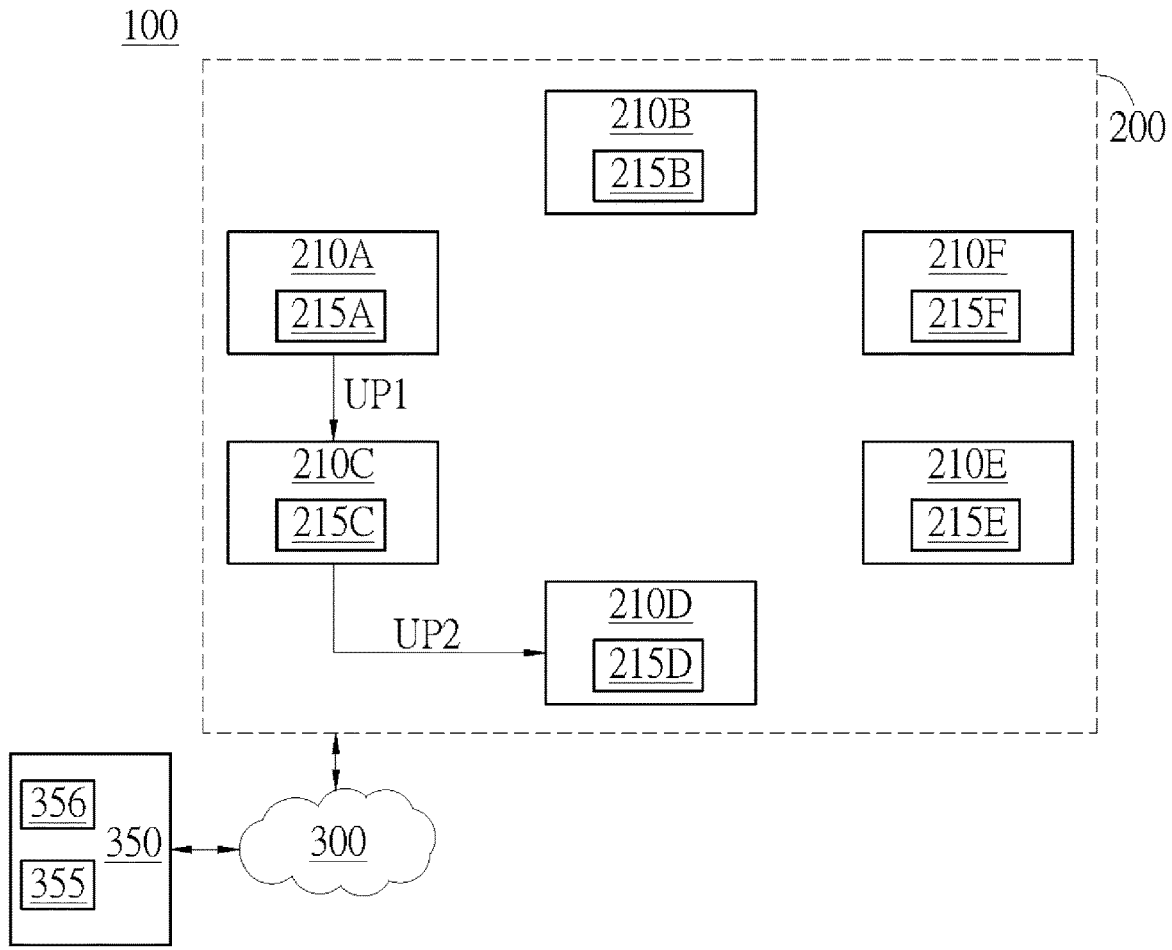
FIG. 2 is a schematic view of an embodiment of the system.

FIG. 2 is a schematic view of an embodiment of the system. As shown in FIG. 2, the system 100 includes a plurality of device nodes 210A-210F and a link manager 350. The device nodes 210A-210F are distributed in a peer-to-peer network 200. In one embodiment, the device nodes are personal computers, workstations or servers. It is noted that, more or less device nodes may be included in the peer-to-peer network 200, and any device node can join or quit the peer-to-peer network 200 as needed.

The device nodes 210A-210F respectively having baseboard management controllers (BMCs) 215A-215F. For example, the device nodes 210A has the BMC 215A, the device nodes 210B has the BMC 215B, etc. The link manager 350 connects to the peer-to-peer network 200 via a management network 300. In a preferred embodiment, the management network 300 is an out-of-band network. The link manager 350 manages the BMCs 215A-215F via the out-of-band network. Out-of-band signaling describes signals that are sent between two parties or two devices that are sent via a path or method different from that of the primary communication between the two parties or devices.

The link manager includes an update engine 356 and a management console 355. In a preferred embodiment, the update engine 356 is a daemon running in the system 100, used to optimize the update process, such as auto-detecting the network flow and system utilization, auto-grouping and auto-regrouping the update group. The link manager 350 sends an update command to the peer-to-peer network. In a preferred embodiment, the link manager sends the update command via the management console 355.

The device nodes include at least a first device node, a second device node and a third device node. The update engine 356 arranges a first update UP1 from the first device node to the second device node, and arranges a second update UP2 from the second device node to the third device node.

It is noted that, the term "first device node", "second device node" and "third device node" refer to any three different device nodes in the peer-to-peer network 200; and the term "first update" and "second update" refer to one update step and another update step after that. In the embodiment shown in FIG. 2, the link manager 350 arranges a first update UP1 from the first device node 210A to the second device node 210C, and arranges a second update UP2 from the second device node 210C to the third device node 210D. In another embodiment, the link manager 350 may arrange a first update UP1 from the first device node 210B to the second device node 210E, and arrange a second update UP2 from the second device node 210E to the third device node 210A (not shown in FIG. 2).

Figure 3:
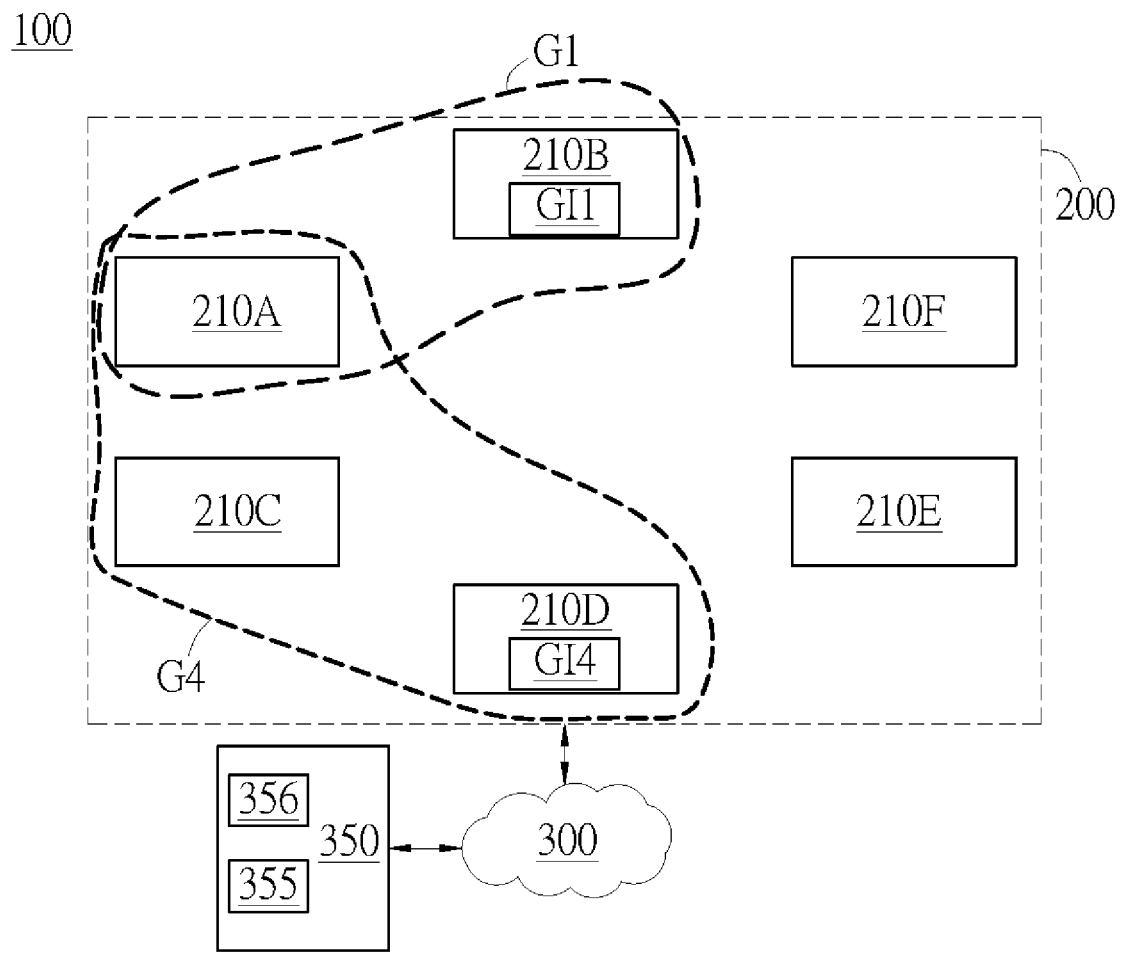
FIG. 3 is an embodiment of the group and the group leader.

FIG. 3 is an embodiment of the group and the group leader. The update engine 356 assigns at least one of the device nodes as a group member to at least one update group. Take FIG. 3 as an example, the update engine 356 assigns device nodes 210A and 210B as group members to update group G1, and assigns device nodes 210A, 210C and 210D as group members to update group G4. It is noted that, a device node could be belonged to more than one update group, such as device node 210A.

The update engine 356 then assigns a group leader to each update group. Each group leader has group information of the update group and exchanges group information with other group leaders. Take FIG. 3 as an example, device node 210B is the group leader of update group G1, and has group information G11 of the update group G1; device node 210D is the group leader of update group G4, and has group information G14 of the update group G4. The group leaders (device node 210B and 210D) exchange group information (G11 and G14) with each other.

In one embodiment, the group information includes a group member list, and a device status of each group member. In one embodiment, the device status includes version information of at least one downloaded source files in the device node.

Figure 4:
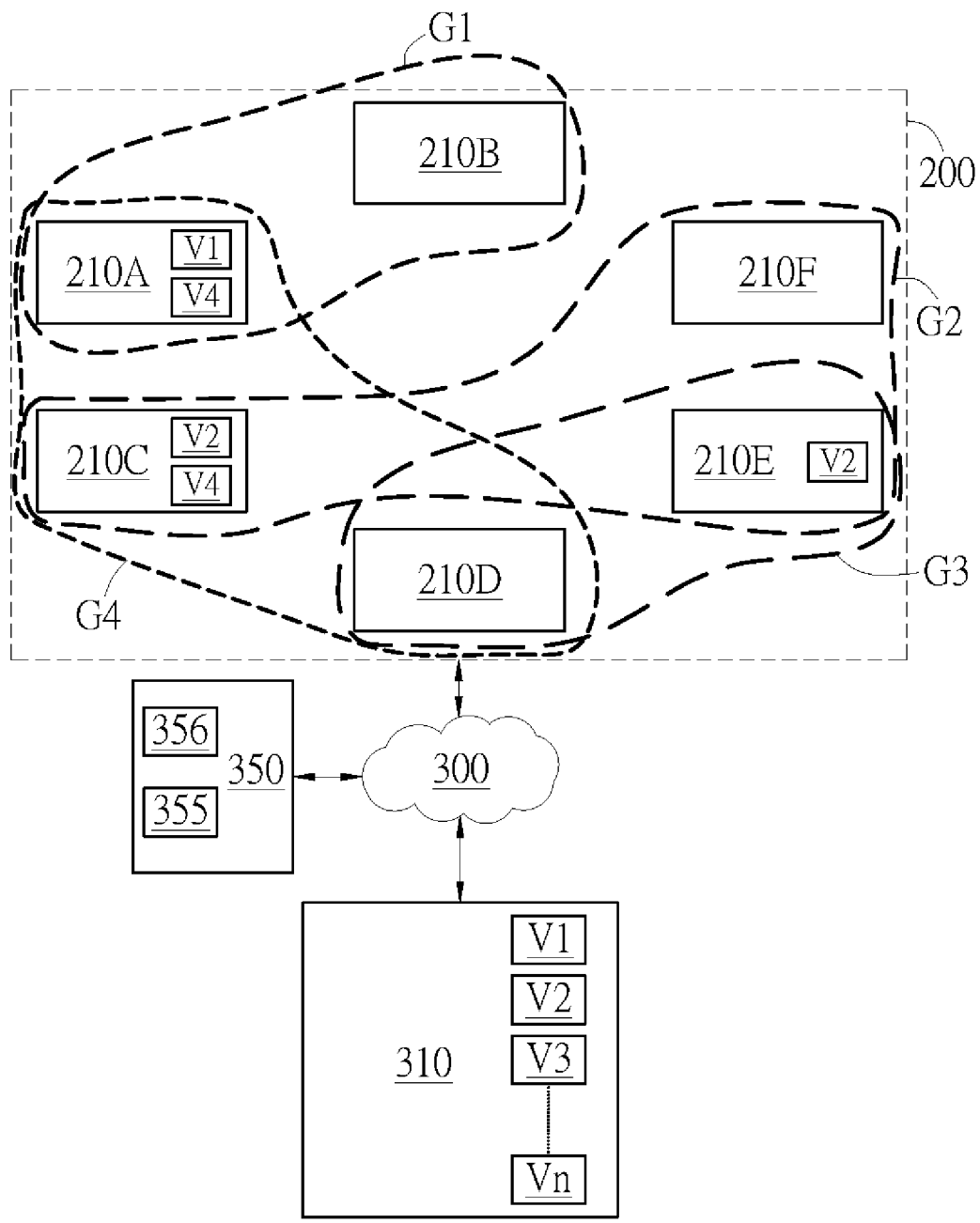
FIG. 4 is a schematic view of another embodiment of the system.

FIG. 4 is a schematic view of an embodiment of the system. As shown in FIG. 4, the system 100 further includes a source node 310. The source node 310 connects to the peer-to-peer network 200 via the management network 300, and has multiple versions V1~Vn of source files. The source node 310 is preferably a host. The link manager 350 is preferably a program run on a host, which can be the source node 310 or any other host in system 100 (not shown in FIG. 4). The source files are sharing files in the peer-to-peer network 200 with multiple versions V1~Vn. In the embodiment shown in FIG. 4, the source node 310 has the original versions V1~Vn of source files, device node 210A has the duplicated versions V1 and V4 of source files, device node 210C has the duplicated versions V2 and V4 of source files, and device node 210E has the duplicated version V2 of source files. These duplicated versions of source files existed in the device nodes are downloaded from the source node 310, any other device node in the system 100, or any other source provider inside or outside the system 100 before the update process.

The update engine 356 assigns at least one device node as a group pmember to at least one update group, and assigns an update version of source files to each update group. Each update group updates the update version of source files through the peer-to-peer network 200. In the embodiment shown in FIG. 4, the link manager 350 assigns device node 210A as a group member to update groups G1 and G4, assigns device node 210B as a group member to update group G1, assigns device node 210C as a group member to update groups G2 and G4, assigns device node 210D as a group member to update groups G3 and G4, assigns device node 210E as a group member to update groups G2 and G3, assigns device node 210F as a group member to update group G2. In other words, device nodes 210A and 210B are the group members of update group G1, device nodes 210C, 210E and 210F are the group members of update group G2, device nodes 210D and 210E are the group members of update group G3, and device nodes 210A, 210C and 210D are the group members of update group G4. It is noted that, more or less update groups G1~Gn could be assigned according to the scenario, and the group members can be added or dropped as needed.

FIG. 5 is an embodiment of the index. The peer-to-peer network 200 has an index 410, as shown in FIG. 5. The index 410 includes a version list of the device nodes 210A~210n in the peer-to-peer network and one or more corresponding downloaded versions V1~Vn of source files of each device node. In one embodiment, only one downloaded version of source files can be found in the device node (such as device node 210E); in another embodiment, more than one downloaded version of source files can be found in the device node (such as device nodes 210A and 210C). It is noted that the device node may have no downloaded version of source files, such as device nodes 210B, 210D and 210F. In the embodiment shown in FIG. 3, device node 210A has downloaded versions V1 and V4 of source files, device node 210B has no downloaded version of source files, device node 210C has downloaded versions V2 and V4 of source files, device node 210D has no downloaded of source files, device node 210E has downloaded version V2 of source files, and device node 210F has no downloaded version of source files. The group leaders update the index 410 after updating the update version of source files.

Figure 6A:
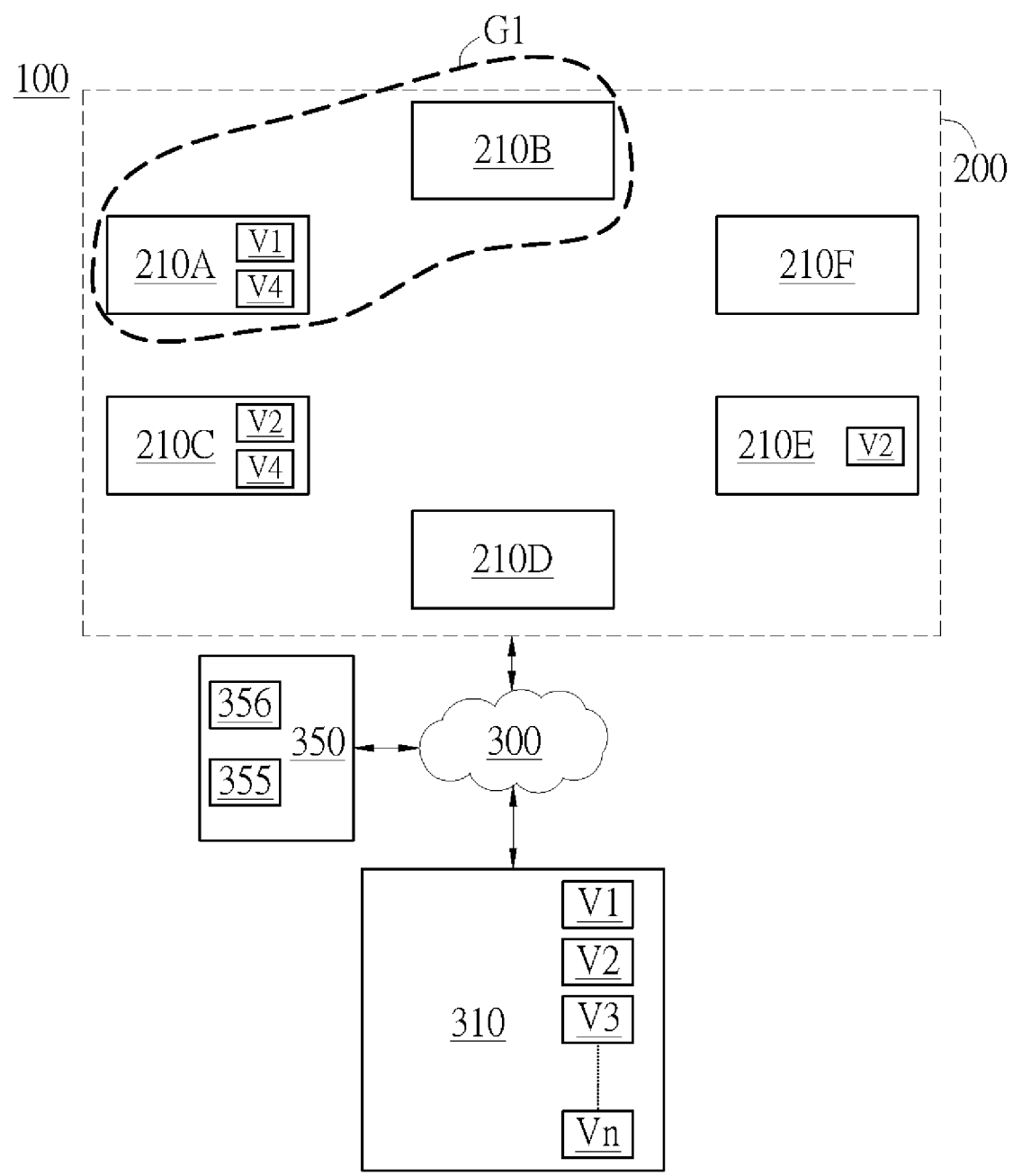
FIGS. 6A to 6D are variant embodiments of the update scenarios.

FIGS. 6A to 6D are variant embodiments of the update scenarios. The update engine 356 checks the correspondences of the device nodes and the downloaded version of source files in the index 410 then assigns a service node to the device nodes 210A~210n for updating based on the correspondences in the index 410. Each device node for updating downloads the update version of source files from service node, as shown in FIG. 6A to 6D. FIG. 6A to 6D are variant embodiments of the update scenarios. In FIG. 6A, the update engine 356 assigns the device node 210A as the service node to the device node 210B for updating based on the index 410. The service node is the device node with the update version of source files and provides the source for updating in the update group, for example, device node 210A is the service node of update group G1. Device node 210B downloads the update version V1 of source files from service node 210A.

Figure 6B:
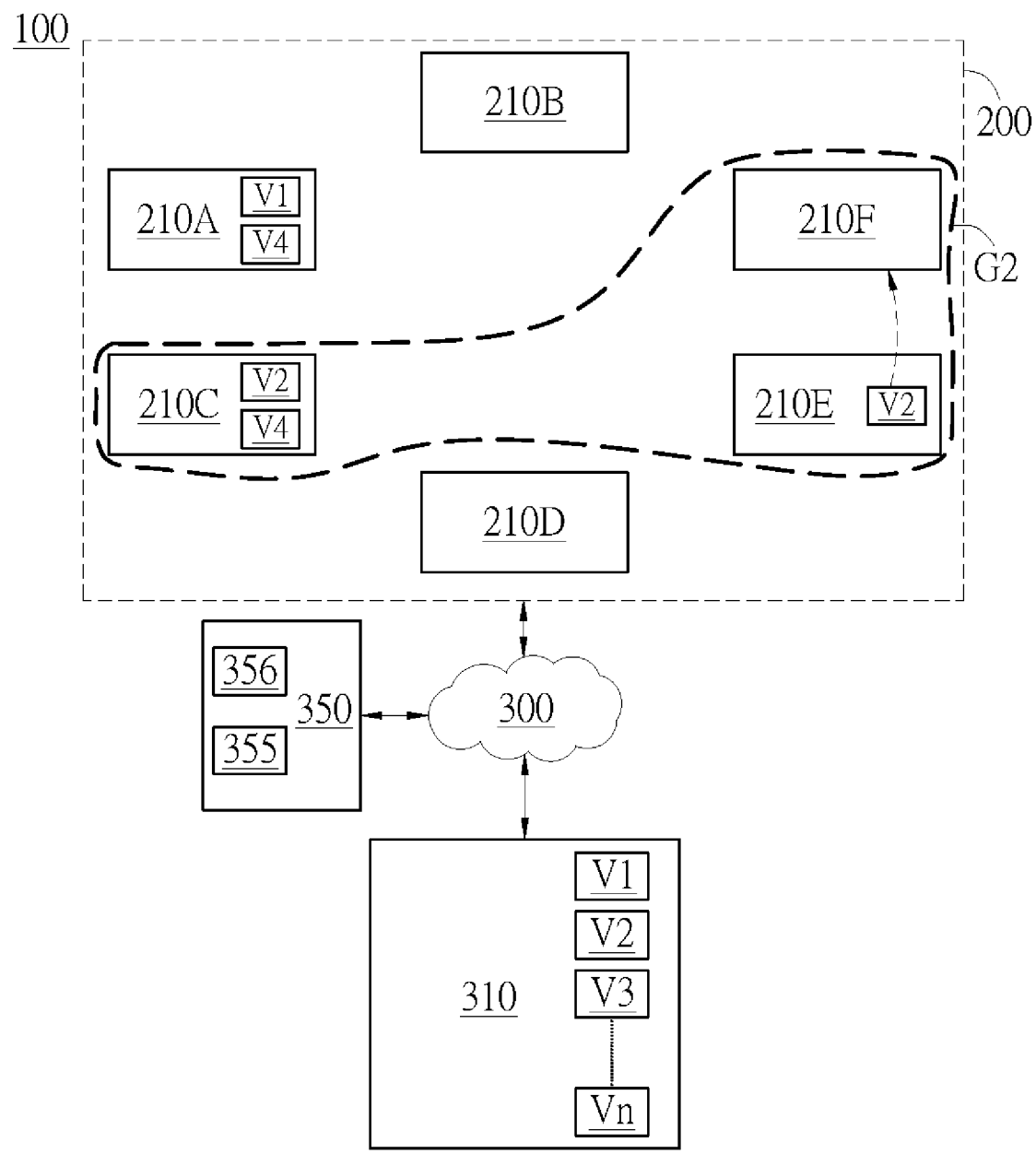

If more than one device node in the update group has the update version of source files, the link manager 350 selects the service node based on a network bandwidth condition, as shown in FIG. 6B. In FIG. 6B, device nodes 210C and 210E both have the update version V2 of the source files, the update engine 356 selects device node 210E as the service node based on the network bandwidth condition. The network bandwidth condition may include, for example and without limitation, packet drop rates, round trip delays, packet retransmission rates, and transmission failure rates.

Figure 6C:
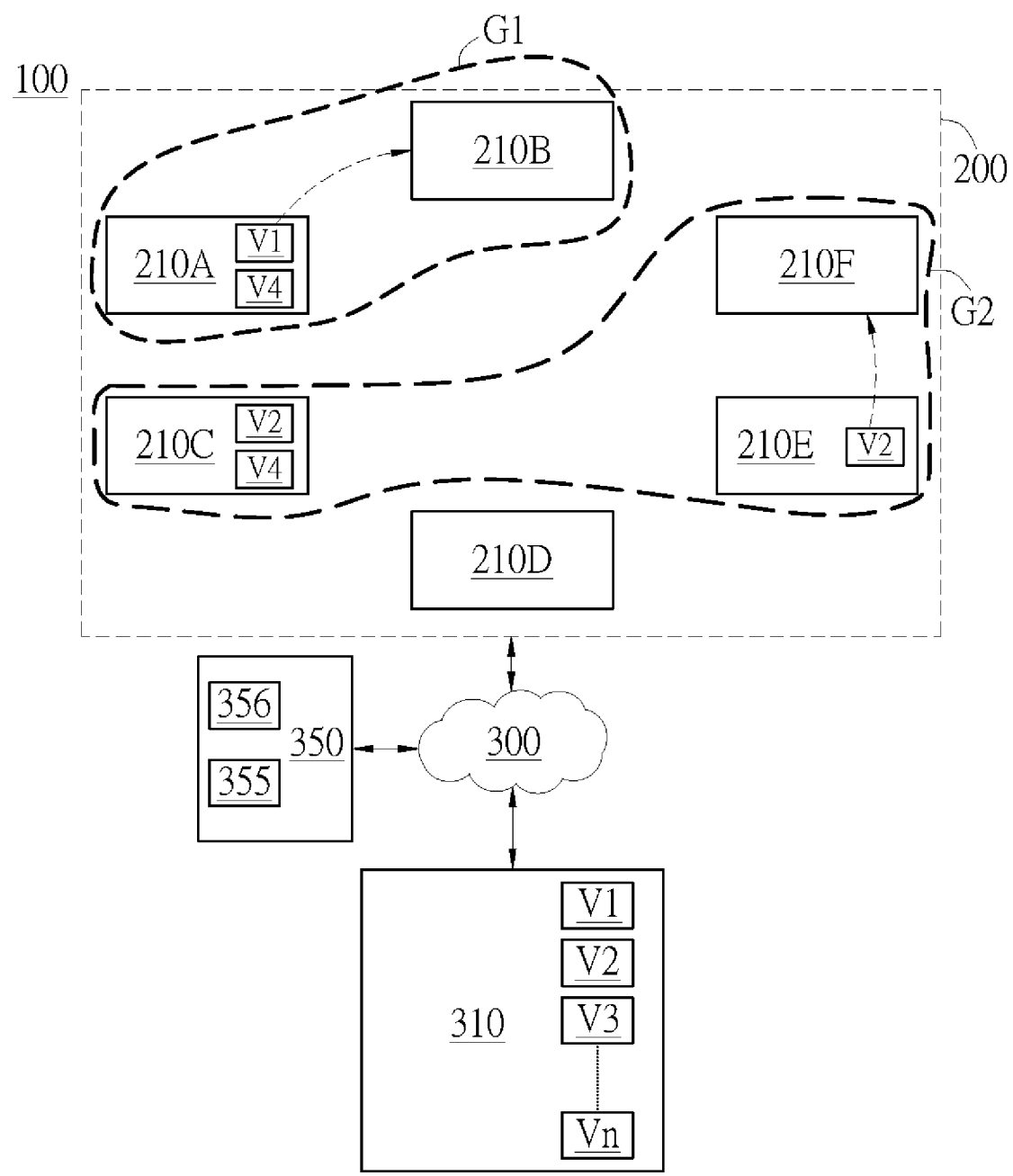

It is noted that different update groups may simultaneously update the update version of source files, as shown in FIG. 6C. In FIG. 6C, the update group G1 updates the update version V1 of the source files while the update group G2 updates the update version V12 of the source files. FIG. 6C illustrates the embodiment of the one-to-one update in each update group, but the one-to-many update and many-to-many update in each update group are also included in other embodiments.

Figure 6D:
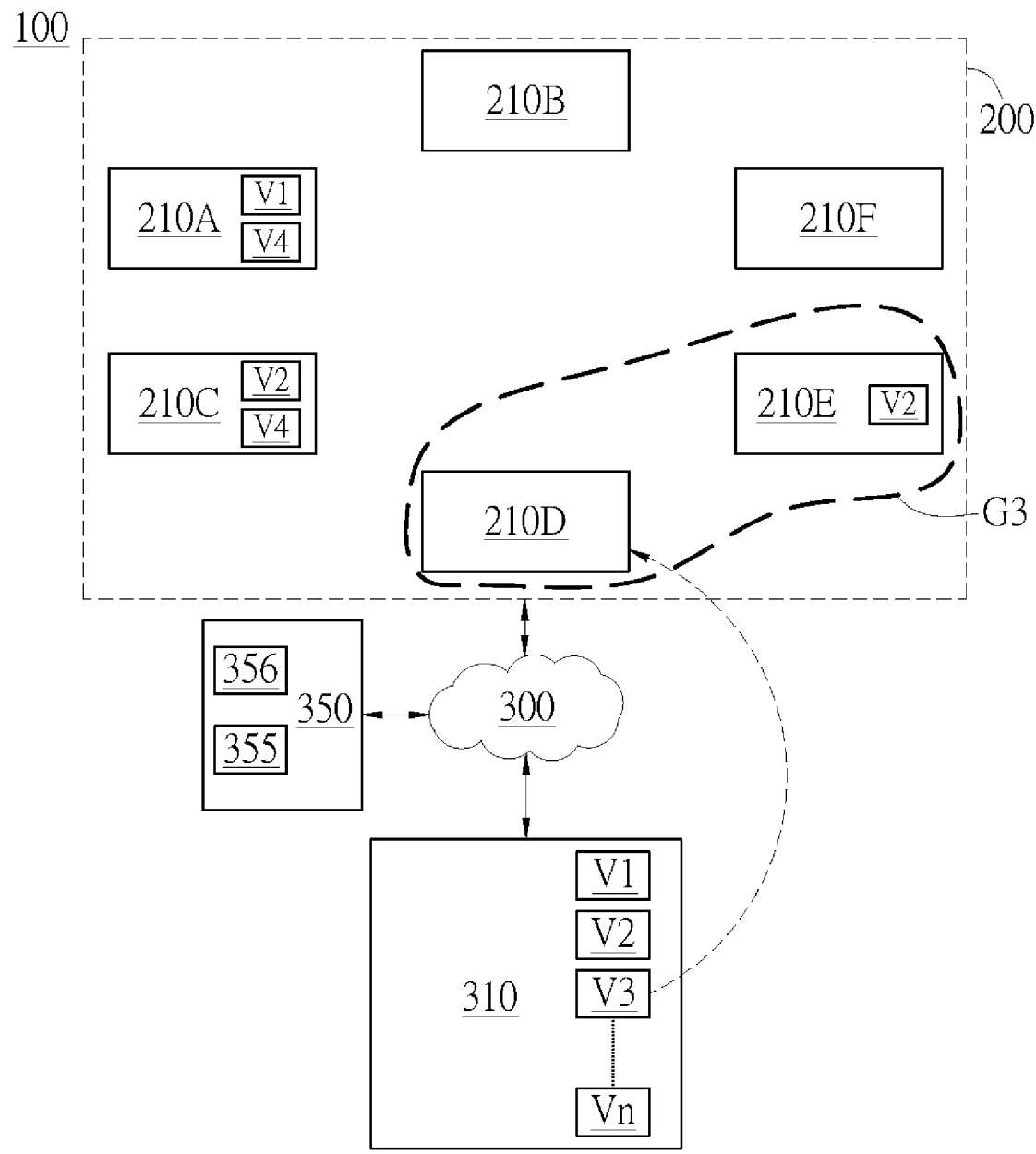

If no device node in the update group has the update version of source files, the update engine 356 assigns the source node 310 as the service node, as shown in FIG. 6D. In FIG. 6D, since no device node in the update group G3 has the update version V3 of the source files, the update engine 356 assigns the source node 310 as the service node, and the device node 210D downloads the update version V3 of the source files directly from the source node 310.

In one embodiment, the device nodes 210A~210n are bare-metal devices and update BMC firmware binary files or BIOS firmware binary files through the peer-to-peer network. In another embodiment, the device nodes can also download the OS image files through the peer-to-peer network. A bare metal device refers to a computer system without a base operating system (OS) or installed applications. In other words, when the device nodes are bare-metal devices, the sharing source files in the peer-to-peer network 200 are BMC firmware binary files, BIOS firmware binary files, or operating system image files, and the device nodes utilize the peer-to-peer network 200 to implement the BMC firmware update, the BIOS firmware update, and the OS installation.

In another embodiment, the device nodes are devices with installed operating system, and update OS patch files or device driver patch files or application files through a peer-to-peer network. In other words, when the device nodes are devices with installed operating system, the source files are BMC firmware binary files, BIOS firmware binary files, operating system patch files, device driver patch files, or application files, and the device nodes utilize the peer-to-peer network 200 to implement the BMC firmware update, the BIOS firmware update, the OS patching, the device driver patching, the application installation and the application update.

Figure 7:
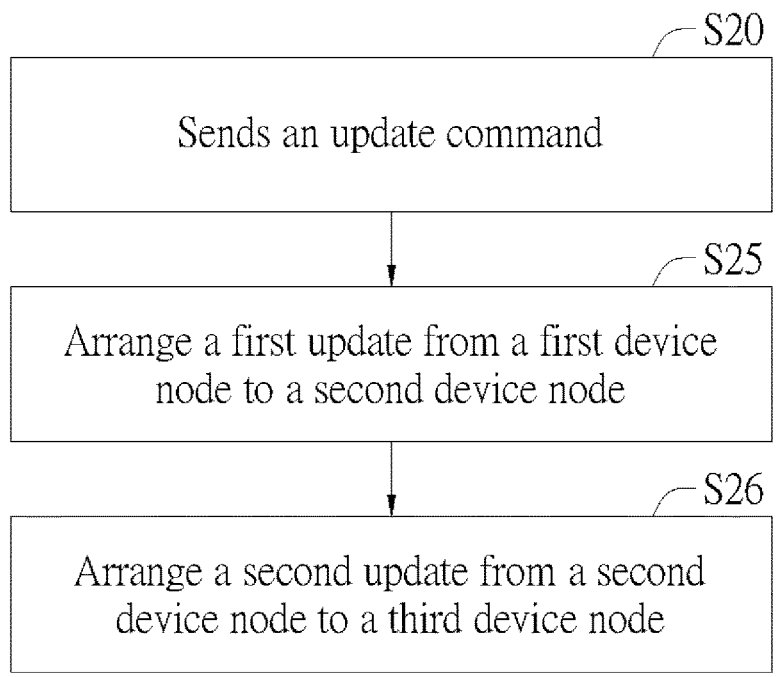
FIG. 7 is a flow chart of an embodiment of the method.

FIG. 7 is flow charts of steps correspond to FIG. 2. As shown in FIG. 7, the method includes the following steps: (S20) the link manager 350 sends an update command to the peer-to-peer network 200; (S25) the update engine 356 arranges a first update UP1 from the first device node to the second device node; and (S26) the update engine 356 arranges a second update from the second device node to the third device node. The first device node, the second device node and the third device node are selected from a plurality of device nodes distributed in a peer-to-peer network; the device nodes respectively have BMCs; and the link manager is connected to the peer-to-peer network via a management network and includes the link manager.

Figure 8:
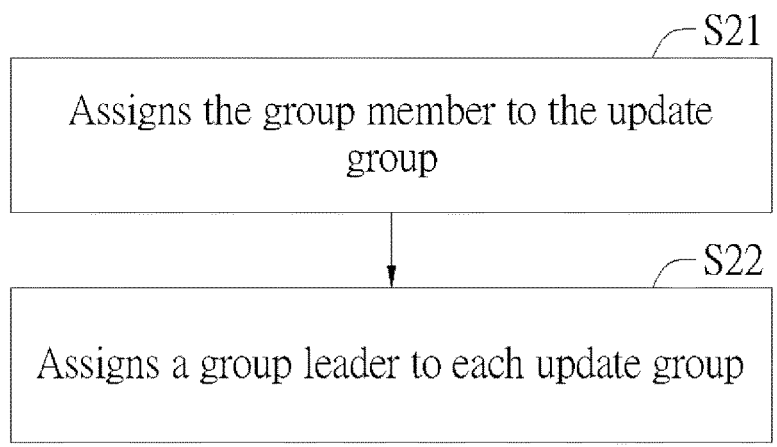
FIG. 8 is a flow chart of another embodiment of the method.

FIG. 8 is flow charts of steps correspond to FIG. 3. As shown in FIG. 8, the method includes the following steps: (S21) The update engine assigns at least one of the device nodes 210A~210n distributed in a peer-to-peer network as a group member to at least one update group G1-Gn. (S22) The update engine assigns a group leader to each update group. Each group leader has group information of the update group and exchanges group information with other group leaders. The group information includes a group member list, and a device status of each group member. The device status includes version information of at least one downloaded source files in the device node.

Figure 9:
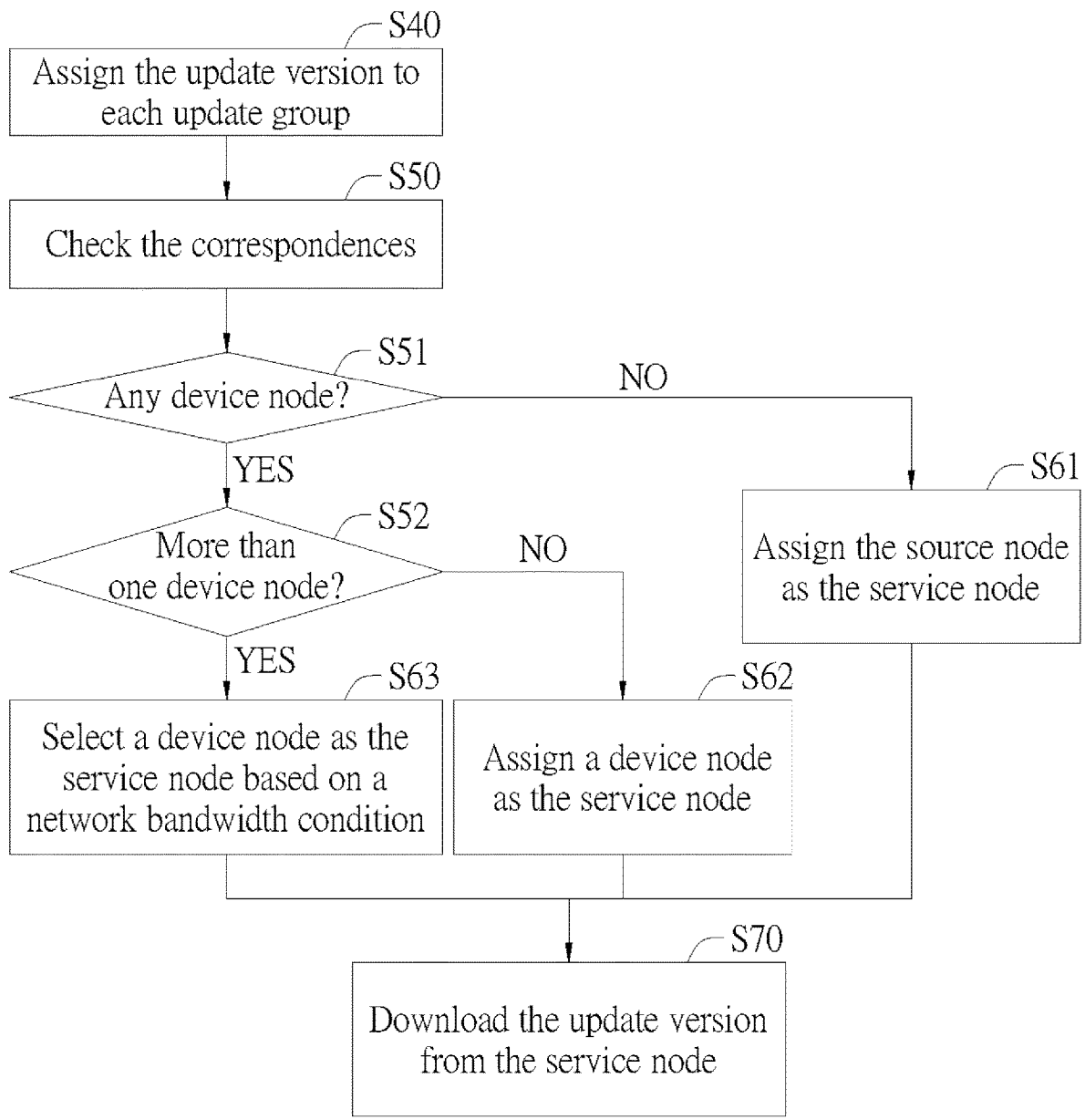
FIG. 9 is a flow chart of another embodiment of the method.

FIG. 9 are flow charts of steps correspond to FIGS. 4 to 6. Before the update. As shown in FIG. 9, the method includes the following steps: (S40) The update engine 356 assigns an update version of source files to each update group G1-Gn. (S50) The update engine 356 checks the correspondences between the device nodes 210A~210n and the downloaded versions of source files in the index 410. (S51) If no device node has the update version of source files, goes to step S61, otherwise goes to step S52. (S52) If more than one device node in the update group has the update version of source files, goes to step S63, otherwise goes to step S62. (S61) The update engine 356 assigns the source node 310 as the service node. (S62) The update engine 356 assigns a service node to the device nodes for updating based on the index 410. (S63) The update engine 356 selects the service node based on a network bandwidth condition. (S70) Each device node for updating downloads the update version of source files from assigned service node.

Figure 10:
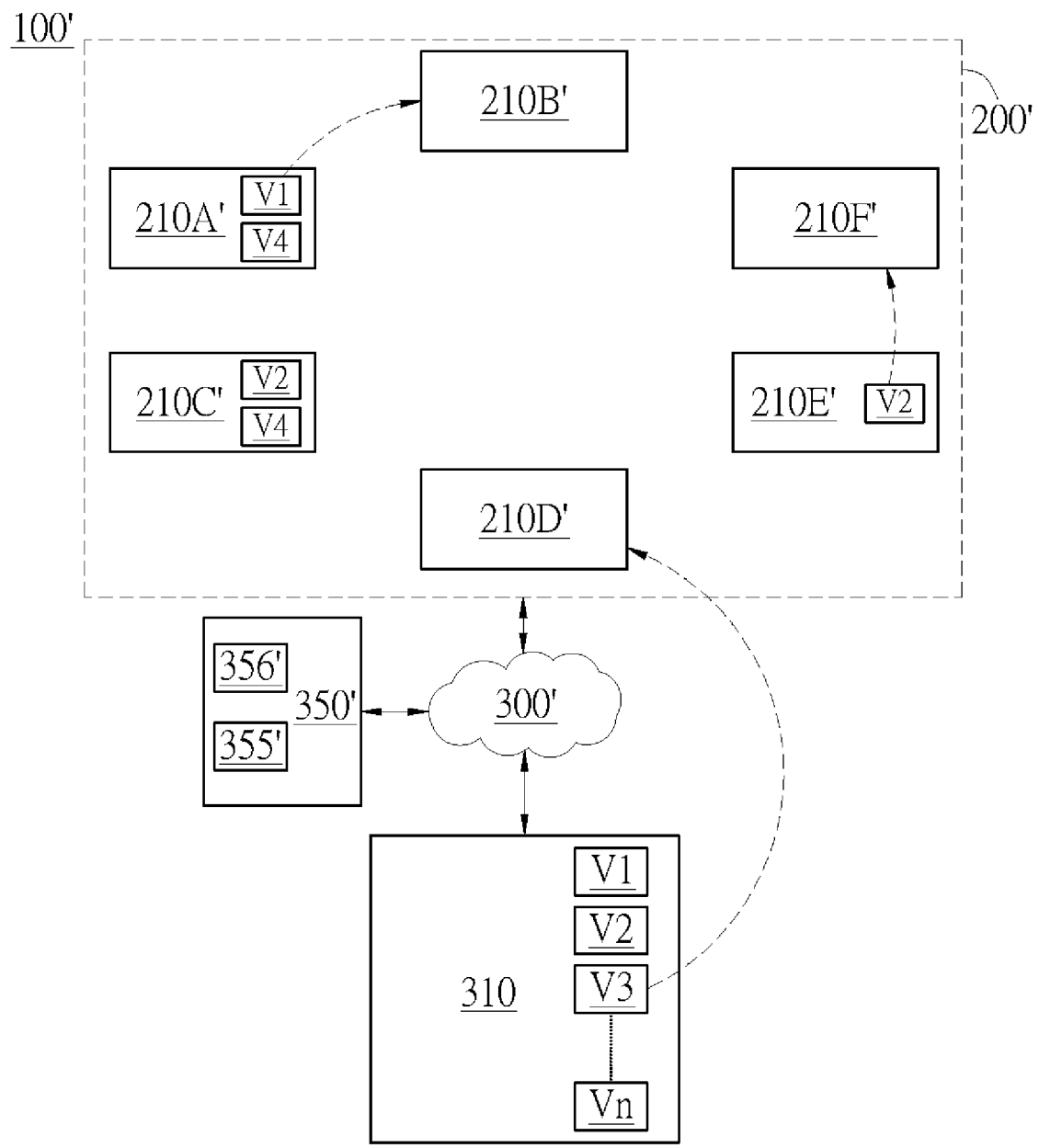
FIG. 10 is a schematic view of an embodiment of the system.
Figure 12:
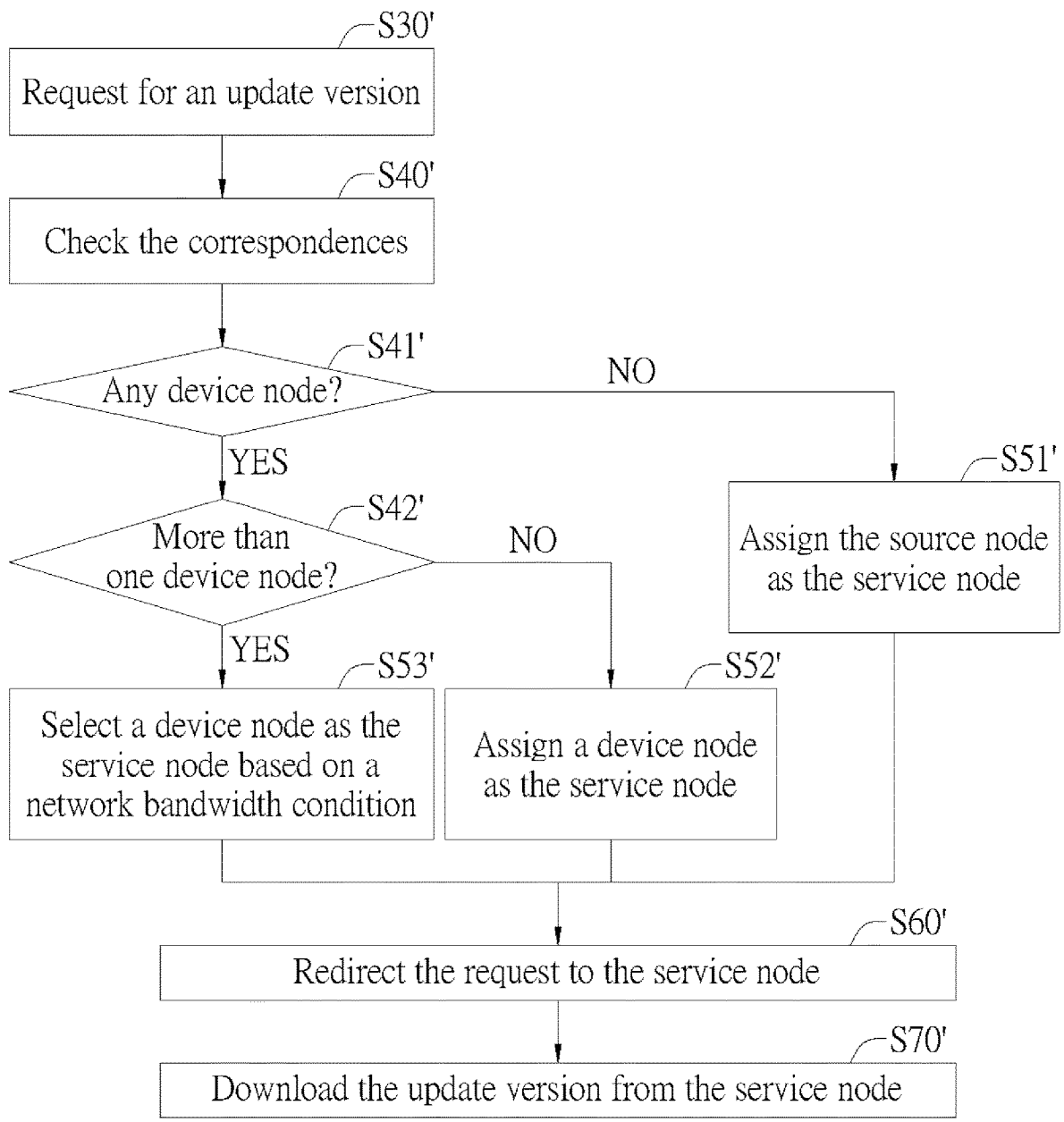
FIG. 12 is a flow chart of an embodiment of the method.

FIGS. 2 to 9 are the first embodiment of files sharing in peer-to-peer network 200. In the first embodiment, the system 100 initiates the files updating by an update command from the link manager 350. FIGS. 10 to 12 are the second embodiment of files sharing in the peer-to-peer network 200. In the second embodiment, the system 100' initiates the files updating by a request from any device node in the peer-to-peer network 200.

FIG. 10 is a schematic view of an embodiment of the system. As shown in FIG. 10, the system 100' includes a plurality of device nodes 210A'~210F', a source node 310' and a link manager 350'. The device nodes 210A'~210F' are distributed in a peer-to-peer network 200' and respectively have baseboard management controllers (BMCs). The link manager 350' connects to the peer-to-peer network 200' via a management network 300'. The link manager 350' includes an update engine 356' and a management console 355'. The source node 310' connects to the peer-to-peer network 200' via the management network 300' and has at least one version V1~Vn of source files.

At least one of the device nodes requests for an update version of source files; and the update engine 356 assigns a service node to the requesting device node and redirects the request to the service node. For example, device node 210B' request for update version V1 of source files, the link manager 350' assigns device node 210A' as the service node to the requesting device node 210B' and redirects the request to the service node 210A'.

FIG. 11 is an embodiment of the index 410'. The peer-to-peer network 200' has an index 410'. The index 410' includes a version list of the device nodes 210A'~210n' and one or more corresponding downloaded versions V1~Vn of source files of each device node. The update engine 356' checks the correspondences of the device nodes 210A'~210n' and the downloaded version V1~Vn of source files in the index 410' then assigns a service node to the device nodes 210A'~210n' for updating based on the correspondences in the index 410'. Each device node for updating downloads the update version V1~Vn of source files from the service node, as shown in FIG. 10. The service node is the device node with the update version of source files, such as device node 210A'.

If more than one device node has the update version of source files, such as device nodes 210C' and 210E', the update engine 356' selects the service node based on a network bandwidth condition. As a result, the update engine 356' selects the device node 210E' as the service node for the requesting device node 210F', and redirect the request to the service node 210E'.

If no device node has the update version of source files, the update engine 356' assigns the source node 310' as the service node. For example, device node 210D' request for update version V3 of source files, and the update engine 356' assigns the source node 310' as the service node.

FIG. 12 is flow chart of steps correspond to FIGS. 10 to 11. As shown in FIG. 12, the method includes the following steps: (S30') At least one of the device nodes 210A'~201n' requests for an update version V1~Vn of source file. (S40') The update engine 356 checks the correspondences between the device nodes 210A'~210n' and the downloaded versions V1~Vn of source files in the index 410'. (S41') If no device node has the update version of source files, goes to step S51', otherwise goes to step S42'. (S42') If more than one device node in the update group has the update version of source files, goes to step S53', otherwise goes to step S52'. (S51') The update engine 356' assigns the source node 310' as the service node. (S52') The update engine 356' assigns a service node to the device nodes for updating based on the index 410'. (S53') The update engine 356' selects the service node based on a network bandwidth condition. (S60') The update engine 356' redirects the request to the service node. (S70') Each requesting device node downloads the update version of source files from the service node.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

What is claimed is:

1. A system for updating files through a peer-to-peer network, comprising:
   a plurality of device nodes distributed in the peer-to-peer network, the device nodes respectively having baseboard management controllers (BMCs), the device nodes having at least two update states including a bare-metal state and an OS-installed state, and all the device nodes being in the same update state; and
   a link manager connected to the peer-to-peer network via a management network, the link manager comprising an update engine; wherein the device nodes comprise at least a first device node, a second device node and a third device node;
   the link manager sends an update command to the peer-to-peer network; and
the update engine using a processor to arrange a first update from the first device node to the second device node, and arrange a second update from the second device node to the third device node according to the update state of the device nodes.

2. The system according to claim 1, wherein
   the update engine assigns at least one of the device nodes as a group member to at least one update group, and assigns a group leader to each update group; and
   each group leader has group information of the update group and exchanges group information with other group leaders.

3. The system according to claim 2, wherein
the group information comprises a group member list, and a device status of each group member.

4. The system according to claim 3, wherein
the device status comprises version information of at least one downloaded source files in the device node.

5. The system according to claim 2, further comprising
   a source node connected to the peer-to-peer network via the management network, the source node having at least one version of source files; wherein
   the update engine assigns an update version of source files corresponding to the update state of the device nodes to each update group; and
   each update group updates the update version of source files through the peer-to-peer network.

6. The system according to claim 1, wherein
   the link manager further comprises a management console, and
   the link manager sends the update command via the management console.

7. The system according to claim 5, wherein
   the peer-to-peer network has an index;
   the index comprises a version list of the device nodes in the peer-to-peer network and one or more corresponding versions of source files of each device node; and
   the group leaders update the index after updating the update version of source files.

8. The system according to claim 7, wherein
   the update engine assigns a service node to the device nodes for updating based on the index;
   each device node for updating downloads the update version of source files from the service node; and
   the service node is the device node with the update version of source files in the update group.

9. The system according to claim 8, wherein
if more than one device node in the update group has the update version of source files, the update engine selects the service node based on a network bandwidth condition.

10. The system according to claim 8, wherein
if no device node in the update group has the update version of source files, the update engine assigns the source node as the service node.

11. The system according to claim 5, wherein
    when the device nodes are bare-metal devices, the update state of the device nodes is the bare-metal state; and
    the source files are BMC firmware binary files, BIOS firmware binary files, or operating system image files.

12. The system according to claim 5, wherein
    when the device nodes are devices with installed operating system, the update state of the device nodes is the OS-installed state; and
the source files are BMC firmware binary files, BIOS firmware binary files, operating system patch files, device driver patch files, or application files.

13. A method for updating files through a peer-to-peer network, comprising:
    sending an update command to the peer-to-peer network by a link manager;
    arranging a first update from a first device node to a second device node and arranging a second update from the second device node to a third device node by an update engine;
wherein
    the first device node, the second device node and the third device node are selected from a plurality of device nodes distributed in a peer-to-peer network;
    the device nodes respectively have baseboard management controllers (BMCs);
    the device nodes have at least two update states including a bare-metal state and an OS-installed state, and all the device nodes are in the same update state;
    the update engine arranges the first update and the second update according to the update state of the device nodes; and
    the link manager is connected to the peer-to-peer network via a management network and comprises the link manager.

14. The method according to claim 13, further comprising:
    assigning at least one of the device nodes distributed in a peer-to-peer network as a group member to at least one update group by the update engine;
    assigning a group leader to each update group by the update engine; wherein
    each group leader has group information of the update group and exchanges group information with other group leaders.

15. The method according to claim 14, wherein
the group information comprises a group member list, and a device status of each group member.

16. The method according to claim 15, wherein
the device status comprises version information of at least one downloaded source files in the device node.

17. The method according to claim 14, further comprising:
    assigning an update version of source files corresponding to the update state of the device nodes to each update group by the update engine; and
    updating the update version of source files through the peer-to-peer network by each update group; wherein
    the update version of source files is selected from multiple versions of source files in a source node connected to the peer-to-peer network via the management network.

18. The method according to claim 13, further comprising sending the update command via a management console of the link manager by the link manager.

19. The method according to claim 17, further comprising:
updating an index of the peer-to-peer network after updating the update version of source files by the group leaders; wherein
the index comprises a version list of the device nodes in the peer-to-peer network and one or more corresponding versions of source files of each device node.

20. The method according to claim 19, further comprising:
assigning a service node to the device nodes for updating based on the index by the update engine; and
downloading the update version of source files from service node by each device node for updating; wherein
the service node is the device node with the update version of source files in the update group.

21. The method according to claim 20, further comprising:
selecting the service node based on a network bandwidth condition by the update engine if more than one device node in the update group has the update version of source files.

22. The method according to claim 20, further comprising:
assigning the source node as the service node by the update engine if no device node in the update group has the update version of source files.

23. The method according to claim 17, wherein
when the device nodes are bare-metal devices, the update state of the device nodes is the bare-metal state; and
the source files are BMC firmware binary files, BIOS firmware binary files, or operating system image files.

24. The method according to claim 17, wherein
when the device nodes are devices with installed operating system, the update state of the device nodes is the OS-installed state; and
the source files are BMC firmware binary files, BIOS firmware binary files, operating system patch files, device driver patch files, or application files.

25. A system for updating files through a peer-to-peer network, comprising:
a plurality of device nodes distributed in the peer-to-peer network, the device nodes respectively having baseboard management controllers (BMCs), the device nodes having at least two update states including a bare-metal state and an OS-installed state, and all the device nodes being in the same update state;
a link manager connected to the peer-to-peer network via a management network, the link manager comprising an update engine; and
a source node connected to the peer-to-peer network via the management network, the source node having at least one version of source files; wherein
at least one of the device nodes requests for an update version of source files corresponding to the update state of the device nodes; and
the update engine using a processor to assign a service node to the requesting device node according to the update state of the device nodes and redirect the request to the service node.

26. The system according to claim 25, wherein
the peer-to-peer network has an index; and
the index comprises a version list of the device nodes in the peer-to-peer network and one or more corresponding versions of source files of each device node.

27. The system according to claim 26, wherein
the update engine assigns the service node based on the index;
each device node for updating downloads the update version of source files from the service node; and
the service node is the device node with the update version of source files.

28. The system according to claim 27, wherein
if more than one device node has the update version of source files, the update engine selects the service node based on a network bandwidth condition.

29. The system according to claim 27, wherein
if no device node has the update version of source files, the update engine assigns the source node as the service node.

30. The system according to claim 25, wherein
when the device nodes are bare-metal devices, the update state of the device nodes is the bare-metal state; and
the source files are BMC firmware binary files, BIOS firmware binary-files, or operating system image files.

31. The system according to claim 25, wherein
when the device nodes are devices with installed operating system, the update state of the device nodes is the OS-installed state; and
the source files are BMC firmware binary files, BIOS firmware binary files, operating system patch files, device driver patch files, or application files.

32. A method for updating files through a peer-to-peer network, comprising:
requesting for an update version of source files by at least one of device nodes; and
assigning a service node to the requesting device node and redirecting the request to the service node by an update engine; wherein
the device nodes are distributed in a peer-to-peer network and respectively have baseboard management controllers (BMCs);
the device nodes have at least two update states including a bare-metal state and an OS-installed state, and all the device nodes are in the same update state;
the device nodes request for an update version of source files corresponding to the update state of the device nodes;
the update engine assigns a service node to the requesting device node according to the update state of the device nodes;
a link manager connects to the peer-to-peer network via a management network and comprises the update engine; and
a source node connects to the peer-to-peer network via the management network and has at least one version of source files.

33. The method according to claim 32, wherein
the peer-to-peer network has an index; and
the index comprises a version list of the device nodes in the peer-to-peer network and one or more corresponding versions of source files of each device node.

34. The method according to claim 33, further comprising:
assigning the service node based on the index by the update engine; and downloading the update version of source files from the service node by each device node for updating; wherein the service node is the device node with the update version of source files.

35. The method according to claim 34, wherein selecting the service node based on a network bandwidth condition by the update engine if more than one device node has the update version of source files.

36. The method according to claim 34, wherein assigning the source node as the service node by the update engine if no device node has the update version of source files.

37. The method according to claim 32, wherein when the device nodes are bare-metal devices, the update state of the device nodes is the bare-metal state; and the source files are BMC firmware binary files, BIOS firmware binary files, or operating system image files.

38. The method according to claim 32, wherein when the device nodes are devices with installed operating system, the update state of the device nodes is the OS-installed state; and the source files are BMC firmware binary files, BIOS firmware binary files, operating system patch files, device driver patch files, or application files.

* * * * *